united States Patent [19]

Stichter

[11] 4,196,162

[45] Apr. 1, 1980

[54] METHOD FOR MAKING GASKET INCLUDING SPHERICAL STOP MEANS AND VULCANIZED IN-SITU

[75] Inventor: Günter Stichter, Rossdorf, Fed. Rep. of Germany

[73] Assignee: SIPAVEL-Sociedade de Isolamentos Para Veiculos, Lda., Lisbon, Portugal

[21] Appl. No.: 13,677

[22] Filed: Feb. 21, 1979

[30] Foreign Application Priority Data

Feb. 23, 1978 [DE] Fed. Rep. of Germany ....... 2807759

[51] Int. Cl.$^2$ .......................... B29D 3/00; B29H 3/00
[52] U.S. Cl. .................... 264/131; 264/261; 264/268; 264/319; 264/347; 277/1; 277/180; 277/227
[58] Field of Search ............... 264/131, 261, 262, 263, 264/275, 277, 272, 347, 268, 319; 277/DIG. 3, 227, 180, 228, 1, 166, 22, 180

[56] References Cited

U.S. PATENT DOCUMENTS

| | | | |
|---|---|---|---|
| 3,001,105 | 9/1961 | Fox | 264/272 |
| 3,077,638 | 2/1963 | Hickam | 277/227 |
| 3,195,906 | 7/1965 | Moyers | 277/180 |
| 3,625,527 | 12/1971 | Brindle | 277/227 |
| 3,863,937 | 2/1975 | Silverman et al. | 277/180 |
| 3,983,677 | 10/1976 | Lundbom | 264/277 |

*Primary Examiner*—W. E. Hoag
*Attorney, Agent, or Firm*—Schmidt, Johnson, Hovey & Williams

[57] ABSTRACT

A process for the production of seals between surfaces operating at elevated temperatures is disclosed wherein a vulcanizable elastomer mixture is vulcanized by the heat transferred from the surfaces, and by the pressure created by adjustment of the space between the surfaces. In the invention, spacers are arranged between the surfaces to determine the final position thereof and hence the thickness of the seals and the pressure resistance of the spacers is higher than that of the elastomer mixture before or during vulcanization.

9 Claims, No Drawings

METHOD FOR MAKING GASKET INCLUDING SPHERICAL STOP MEANS AND VULCANIZED IN-SITU

The invention concerns a process for the production of seals between two surfaces under elevated operating temperatures. In this process, a vulcanizable elastomer mixture is vulcanized by the heat which is produced by the elevated operating temperature transferred to these surfaces, the pressure being created by adjustment of the desired final space between the surfaces. The invention further concerns a sealing element for application for the process according to this invention.

A process for the production of gaskets for flanges with elevated operating temperature is known from the German Pat. No. 22 03 485. According to this, an elastomer mixture consisting of polyacrylate is pressed by pushing the other flange against the elastomer mixture into the working position of the flange whereupon the heating of the elastomer mixture through the operating temperature of the two flanges produces vulcanization. In the U.S. Pat. No. 3,376,372, seals from elastomer mixtures of gelled polychloroprene or styrene-butadiene-copolymers are described which are vulcanized upon one of the surfaces to be sealed under the influence of pressure and heat.

In the production of seals of the above-mentioned type, the vulcanizing pressure is effected by pressing the surfaces to be sealed, together, generally by tightening the gasket bolts. In this, however, there is always the danger that the elastomer mixtures which are still capable of flowing during vulcanization, are pressed out between the surfaces to be sealed by the vulcanizing pressure, either by excessive tightening of the gasket bolts or equivalent means. This results in the presence of an undesirably thin layer of the sealing material after vulcanization which makes sufficient sealing effectiveness questionable, especially at constant operation at elevated temperatures.

According to the present invention, durable seals between surfaces functioning under elevated operating temperatures are produced. This is done by determining the final position of the surfaces to be sealed, and, hence, the thickness of the seal, by spacers, arranged between the surfaces to be sealed. The pressure resistance of these spacers is greater than that of the elastomer mixture before or during vulcanization.

The application of the spacers between the surfaces to be sealed according to this invention, permits a precise and always reproducible adjustment of the thickness of the seal to any sealing task. When tightening the gasket bolts or -nuts, the spacers produce a resistance, indicating that the desired final position of the surfaces and, hence, the required thickness of the seal has been attained. It cannot occur that the sealing material is pushed out between the surfaces to be sealed in undesirable amounts, by tightening gasket-bolts or -nuts, which would result in the thickness of the vulcanized gasket falling below the desired dimensions.

The spacers remain, in any case, within the completely vulcanized seal. According to one form of execution according to this invention, they can be arranged in the shapes of cones, cams, flanges or similarly profiled elements on at least one of the surfaces and be solidly connected with it. The advantage of a seal, vulcanized "in situ" is expressed here, inasmuch as any roughness or unevenness of the surface to be sealed, have no influence on the effectiveness of the seal, since the seal excellently adapts to all discontinuities of the surfaces of the elements to be sealed. The surfaces to be sealed can, therefore, be left in any desired treating condition without requiring an expensive chemical or mechanical surface treatment.

According to an especially useful form of application of the process according to this invention, the spacers are included in the elastomer mixture and distributed within it as uniformly as possible prior to shaping. The sealing material is used in plastic condition for the admixture of the spacers. In this condition, it can then also be shaped into plates or endless sheets, from which the sealing elements can then be punched in any desired shape. These seals are then applied to the surfaces to be sealed, whereby a certain excess is allowed for the thickness of the unvulcanized sealing elements. The thickness reduction of the unvulcanized gasket up to the "in situ" vulcanized sealing element can amount to as much as 50%, it is usually between 10% and 30%.

In this application form, shape-retaining, essentially spherical shapes are used as spacers, these are, especially, balls or ball-like forms of hard rubber, ceramic, lead, wood or also glass. The dimensions of the spherical shapes that are to be added, as spacers, to the original mixture or that are to be added to the sealing element during punching, depends on the desired thickness of the completely vulcanized seal. The number of the spacers depends on the size of the areas between which the seal is to be effective.

All natural or synthetic rubber types or rubber-like materials that can be processed with plasticizers, fillers and vulcanizing materials into originally plastic vulcanizable products, are suitable for the composition of the elastomer mixture.

Special advantages to the process of this invention result from the admixture of shredded cork alone or in combination with other fillers as auxiliary material for the mixture to be vulcanized. The added shredded cork may amount to as much as 70% of the weight of the total mixture. Since rubber, containing shredded cork, swells under the influence of oil, this results, in this application form of the process of this invention, in a very good seal, that resists oil and gasoline up to 180° C. and is useful especially as gasket material for engine-parts.

The sealing elements that are used for the execution of the process according to this invention, consist of a vulcanizable elastomer mixture and are characterized by the fact that they contain, in essentially even distribution, shape-retaining bodies of basically spherical form, especially balls and ball-shaped forms. These bodies may consist of hard rubber, ceramics, lead, wood, glass or other materials, whose pressure resistance is greater than that of the elastomer mixture prior to or during vulcanization. The sealing elements, in relation to the finished vulcanized seal are used with an excess size of up to 100%. In general, the excess thickness of the sealing elements to be vulcanized, amounts to about 10% to 30%. This means that the effective dimensions of the shapes introduced as spacers into the sealing element or sealing mass, e.g., the diamter of the balls, amounts to about 50% to 90% of the thickness of the unvulcanized sealing element.

A very important advantage of the process according to this invention is in the fact that the non-vulcanized waste material, produced during punching of the sealing element, can be reused either unchanged or in the form of a blend with new materials for the production of new sealing elements. In the case that it is considered to be valuable to reuse the punched-out material without enclosed spacer material, it is possible, according to a special form of the process of this invention, to arrange for the introduction of the bodies, serving as spacers, on the forming machine, e.g., the punch press, so that the punch press waste can be reused free of spacer bodies and, therefore, can be utilized for any desired purpose.

The invention is described on the basis of the following examples:

EXAMPLE 1

The mixture used for the production of the sealing elements to be vulcanized had the following composition:

| Raw Material | | Parts by Weight |
|---|---|---|
| 1. | Acrylic-butadiene-rubber (caoutchouc) (solid) | 100 |
| 2. | Acrylic-butadiene-rubber (liquid) | 10 |
| 3. | Isoprene rubber (natural or synthetic) | 40 |
| 4. | Zinc oxide | 8 |
| 5. | Magnesia | 13 |
| 6. | Calcium oxide | 4 |
| 7. | Coumarone resin | 5 |
| 8. | MT-black (medium thermal black; MT-Meteor from Lehmann-Voss Corporation) | 50 |
| 9. | SRF-black (semi-reinforcing furnace black; Ketjen-Black from Akzo-Chemie Corp.) | 50 |
| 10. | Sulfur | 1 |
| 11. | 2-mercapto-benzimidazol | 2 |
| 12. | 2,2,4-trimethyl-1,2-dihydro-quinoline,polym. | 2 |
| 13. | tertamethyl-thiuram-disulfide | 1 |
| 14. | benzothiazyl-2-cyclohexyl-sulfenamide | 3 |
| 15. | polyglycolester plasticizer on the basis of a mixture of monocarboxylic acids, Plastikator 8o | 10 |

This mixture was produced in an internal mixer and subsequently processed into a 4 mm thick continuous sheet. Hard rubber balls with a diameter of 3 mm were uniformly sifted onto the sheet from several orifices and impressed into the sheet by means of a minimum-pressure rolling mill. Ring-shaped sealing elements were punched from the sheet and vulcanized "in situ" under the pressure of the punch-bolting, whereby the sealing elements were compressed to a thickness of 3 mm.

EXAMPLE 2

The mixture to be vulcanized, having a composition of

| Raw Material | | Parts by Weight |
|---|---|---|
| 1. | Acrylic-butadiene-rubber(solid) | 100 |
| 2. | Acrylic-butadiene-rubber (liquid) | 10 |
| 3. | Isoprene-rubber (natural or synthetic) | 40 |
| 4. | Zinc oxide | 8 |
| 5. | Magnesia | 13 |
| 6. | Calcium oxide | 4 |
| 7. | Coumarone resin | 5 |
| 8. | MT-black (medium thermal black; MT-Meteor from Lehmann-Voss Corporation) | 50 |
| 9. | SRF-black (semi-reinforcing furnace black; Ketjen-Black from Akzo-Chemie Corp.) | 50 |
| 10. | Sulfur | 1 |
| 11. | 2-mercapto-benzimidazole | 2 |
| 12. | 2,2,4-trimethyl-1,2-dihydroquinoline, polym. | 2 |
| 13. | Tetramethyl-thiuram disulfide | 1 |
| 14. | Benzothiazyl-2-cyclohexyl-sulfenamide | 3 |
| 15. | Shredded cork | 500 |
| 16. | Polyglycol-ester plasticizer on the basis of a mixture of monocarboylic acids, Plastikator 8o | 10 | was produced in an internal mixer and blended with about 1 wt-% of wooden balls with a diameter of about 2.5 mm, prior to screw-extrusion. A sheet of 3.4 mm thickness was produced on the calender, from which sealing elements were punched. The waste was reused completely.

EXAMPLE 3

Composition of mixture:

| Raw Material | | Parts by Weight |
|---|---|---|
| 1. | Acrylonitrile-butadiene rubber (caoutchouc) | 100 |
| 2. | Stearic acid | 0.5 |
| 3. | Zinc oxide | 5 |
| 4. | Magnesia | 10 |
| 5. | MT-black (medium thermal black - cf. Example 1) | 40 |
| 6. | SRF-black (semi-reinforcing furnace black - cf. Example 1) | 40 |
| 7. | Thioester plasticizer, e.g. methylene-bis-thioglycolic acid butylester | 15 |
| 8. | Coumaron resin | 6 |
| 9. | 2-mercapto-benzimidazole | 1.5 |
| 10. | 2,2,4-trimethyl-1,2-dihydroquinoline, pol. | 1.5 |
| 11. | Sulfur | 0.2 |
| 12. | Tetramethyl-thiuram disulfide | 2.5 |
| 13. | Benzothiazyl-2-cyclohexyl-sulfenamide | 2 |
| 14. | Shredded cork | 75 |

5 wt-% of lead balls with a 3 mm diameter were worked into the mixture in the mixing rolls, then, rolling sheet of 5 mm thickness was extruded and the sealing elements stamped from this. The stamping waste proved to be completely reusable and was reprocessed on the rollers.

EXAMPLE 4

From a mixture of the following composition

| Raw Material | | Parts by Weight |
|---|---|---|
| 1. | Acrylonitrile-butadiene rubber (caoutchouc) | 100 |
| 2. | Styrene-butadiene rubber | 10 |
| 3. | Zinc oxide | 5 |
| 4. | Tetramethyl-thiuram disulfide | 2.5 |
| 5. | Sulfur | 0.3 |
| 6. | Diphenyl-guanidine | 1 |
| 7. | Kaolin | 20 |
| 8. | Thioester plasticizer, e.g. methylene-bis-thioglycoliacid butylester | 30 |
| 9. | Phenyl- β-naphthylamine | 1.5 |
| 10. | Shredded cork | 100 | a rolling sheet of 2 mm thickness was extruded from mixing rolls. Gaskets for cylinderhead covers were punched from this sheet, whereby glass balls of 1 mm diameter were impressed into the sheet on the punch press. The punching waste was free of glass balls and was used for the production of further gaskets.

EXAMPLE 5

A mixture of the following composition

| Raw Material | | Parts by Weight |
| --- | --- | --- |
| 1. | Acrylonitrile-butadiene rubber | 100 |
| 2. | Zinc oxide | 5 |
| 3. | Stearic acid | 0.5 |
| 4. | Coumaron resin | 20 |
| 5. | Sulfur | 5 |
| 6. | Dibenzothiazyl disulfide | 3 |
| 7. | Dioctylphthalate | 20 |
| 8. | Shredded cork | 120 | was processed on the extruder and extruded from a flat sheeting die into a sheet of 3.2 mm thickness. Cylinder-head cover gaskets were punched. On the cover of the cylinder heads, for the sealing of which the mixture had been produced, 4 each studs of 2.5 mm height had been attached, establishing the thickness of the finished gasket.

EXAMPLE 6

A mixture of the following composition

| Raw Material | | Parts by Weight |
| --- | --- | --- |
| 1. | Acrylonitrile-butadiene rubber | 100 |
| 2. | Styrol-butadiene rubber | 20 |
| 3. | Zinc oxide | 10 |
| 4. | Magnesia | 10 |
| 5. | Coumaron resin | 4 |
| 6. | Mt-black (medium thermal black - cf. Example 1) | 40 |
| 7. | SRF-black (semi-reinforcing furnace black - cf. Example 1) | 40 |
| 8. | 2-mercapto-benzimidazole | 1.6 |
| 9. | 2,2,4-trimethyl-1,2-dihydroquinoline, pol. | 1.6 |
| 10. | Sulfur | 0.6 |
| 11. | Dimethyl-diphenyl thiuramdisulfide | 2.3 |
| 12. | Benzothiazyl-2-sulfene morpholide | 2.0 |
| 13. | Aromatic polyether-plasticizer, Plastikator FH | 10 | was processed in the internal mixer, together with polyamide balls of 1.5 mm diameter and then calendered into a sheet of 2.1 mm thickness. Sealing elements were produced from this sheet, after which the stamping-waste was recycled, together with the balls, for reuse.

Having thus described the invention, what is claimed as new and desired to be secured by Letters Patent is:

1. In a method for sealing between two surfaces which operate at elevated temperatures wherein a vulcanizable elastomer composition is vulcanized in-situ by heat from said surfaces as a result of said elevated temperatures and under pressure developed by adjustment of spacing between said surfaces the improvement comprising:
forming a sheet of unvulcanized elastomer composition, depositing a layer of spherical bodies of a suitable size and material on said sheet to limit compression of said elastomer composition between said surfaces, embedding said bodies at least partially in said sheet, inserting said sheet between said surfaces and curing said elastomer in-situ.

2. The process according to claim 1 wherein the spherical bodies are made from material selected from the group consisting of lead, hard rubber, ceramics, wood or glass.

3. The process according to claim 1 wherein the elastomer composition contains up to about 70% shredded cork.

4. The process according to claim 1 wherein the composition is performed into sealing elements and are thus exposed to vulcanization between the surfaces to be sealed.

5. The process according to claim 1 wherein the composition includes, fillers, plasticizers and vulcanizers.

6. The process according to claim 1 wherein at least one of the surfaces is solidly connected to spacers.

7. The process according to claim 6 wherein said spacers are in the shape of cones.

8. The process according to claim 6 wherein said spacers are in the shape of cams.

9. The process according to claim 1 wherein said spherical bodies are wholly embedded within said sheet.

* * * * *